(12) United States Patent
Jung

(10) Patent No.: US 10,388,999 B2
(45) Date of Patent: Aug. 20, 2019

(54) BATTERY MODULE

(71) Applicant: SAMSUNG SDI CO., LTD., Yongin-si, Gyeonggi-do (KR)

(72) Inventor: Jungkyun Jung, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 61 days.

(21) Appl. No.: 15/601,462

(22) Filed: May 22, 2017

(65) Prior Publication Data

US 2018/0040931 A1 Feb. 8, 2018

(30) Foreign Application Priority Data

Aug. 2, 2016 (KR) .................. 10-2016-0098452

(51) Int. Cl.
| | |
|---|---|
| *H01M 2/04* | (2006.01) |
| *H01M 2/02* | (2006.01) |
| *H01M 10/04* | (2006.01) |
| *H01M 10/613* | (2014.01) |
| *H01M 10/6554* | (2014.01) |
| *H01M 10/658* | (2014.01) |
| *H01M 2/10* | (2006.01) |
| *H01M 10/42* | (2006.01) |
| *H01M 10/655* | (2014.01) |

(52) U.S. Cl.
CPC ....... *H01M 10/613* (2015.04); *H01M 2/0212* (2013.01); *H01M 2/0413* (2013.01); *H01M 2/1016* (2013.01); *H01M 10/0486* (2013.01); *H01M 10/425* (2013.01); *H01M 10/655* (2015.04); *H01M 10/658* (2015.04); *H01M 10/6554* (2015.04); *H01M 2/1094* (2013.01)

(58) Field of Classification Search
CPC ........... H01M 2/02–1094; H01M 10/04–0463; H01M 10/60–667
See application file for complete search history.

(56) References Cited

U.S. PATENT DOCUMENTS

| | | | | |
|---|---|---|---|---|
| 5,534,364 | A * | 7/1996 | Watanabe | B60L 3/0046 180/65.1 |
| 7,955,729 | B2 | 6/2011 | Onuki et al. | |
| 2012/0070699 | A1* | 3/2012 | Imaizumi | H01M 2/105 429/7 |
| 2015/0136504 | A1* | 5/2015 | Tsujimura | H01M 2/1077 180/68.5 |

FOREIGN PATENT DOCUMENTS

| | | |
|---|---|---|
| JP | 2012-226872 | 11/2012 |
| JP | 2015-025504 | 2/2015 |
| KR | 10-2008-0022485 | 3/2008 |

* cited by examiner

*Primary Examiner* — Jonathan G Leong
*Assistant Examiner* — Jacob Buchanan
(74) *Attorney, Agent, or Firm* — Lee & Morse, P.C.

(57) ABSTRACT

Provided is a battery module including a first cooling plate, a battery pack mounted on the first cooling plate, a cover to shield the battery pack, the cover being coupled to the first cooling plate, a coupling portion fixed to the cover, and a circuit module into which the coupling portion is inserted, the circuit module being mounted on the cover to be electrically connected to the battery pack.

7 Claims, 5 Drawing Sheets

BATTERY MODULE

CROSS-REFERENCE TO RELATED APPLICATION

Korean Patent Application No. 10-2016-0098452, filed on Aug. 2, 2016, in the Korean Intellectual Property Office, and entitled: "Battery Module," is incorporated by reference herein in its entirety.

BACKGROUND

1. Field

One or more embodiments relate to a battery module.

2. Description of the Related Art

In general, a secondary battery is rechargeable and dischargeable unlike a primary battery that may not be recharged. A secondary battery is used as an energy source in mobile devices, electric vehicles, hybrid vehicles, electric bicycles, and uninterruptible power supplies, and may be in the form of a single battery or a battery module, in which a plurality of batteries are electrically connected as a single unit, according to kinds of external devices to which the secondary battery is applied.

A small sized mobile device such as a mobile phone is operable using the output and capacity of a single battery, but electronic vehicles or hybrid vehicles consume a relatively large amount of electric power to drive for a long time with high electric power and thus use a module type including a plurality of batteries. In addition, an output voltage or an output current may increase according to the number of batteries included in the module.

SUMMARY

Embodiments are directed to a battery module including a first cooling plate, a battery pack mounted on the first cooling plate, a cover to shield the battery pack, the cover being coupled to the first cooling plate, a coupling portion fixed to the cover, and a circuit module into which the coupling portion is inserted, the circuit module being mounted on the cover to be electrically connected to the battery pack.

The coupling portion may be fixed to the cover by a weld.

An external surface of the cover to which the coupling portion is coupled may be engraved in a direction toward the first cooling plate.

The engraved external surface of the cover may have an inclined edge.

The coupling portion may include a head portion fixed to the cover and an inserting portion protruding from the head portion.

The circuit module may further include a sealing portion, the sealing portion being located closer to a center of the circuit module than the coupling portion.

A part of the circuit module may contact an external surface of the cover.

The battery module may further include a bushing portion positioned between the coupling portion and the circuit module.

A surface of the cover that is in contact with the coupling portion may be spaced apart from the circuit module.

The battery module may further include a fixing portion coupled to the coupling portion to fix a position of the circuit module.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
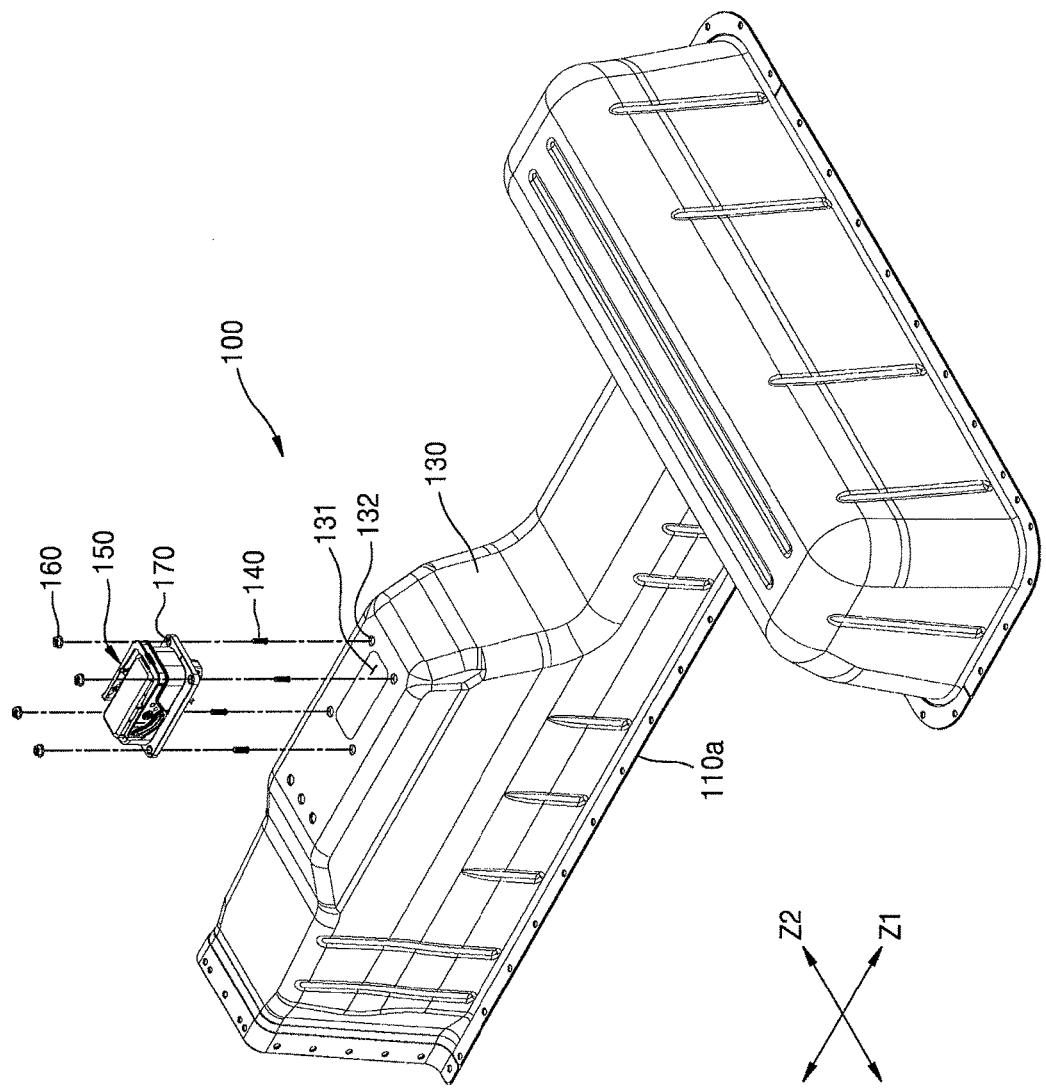
FIG. 1 illustrates an exploded perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
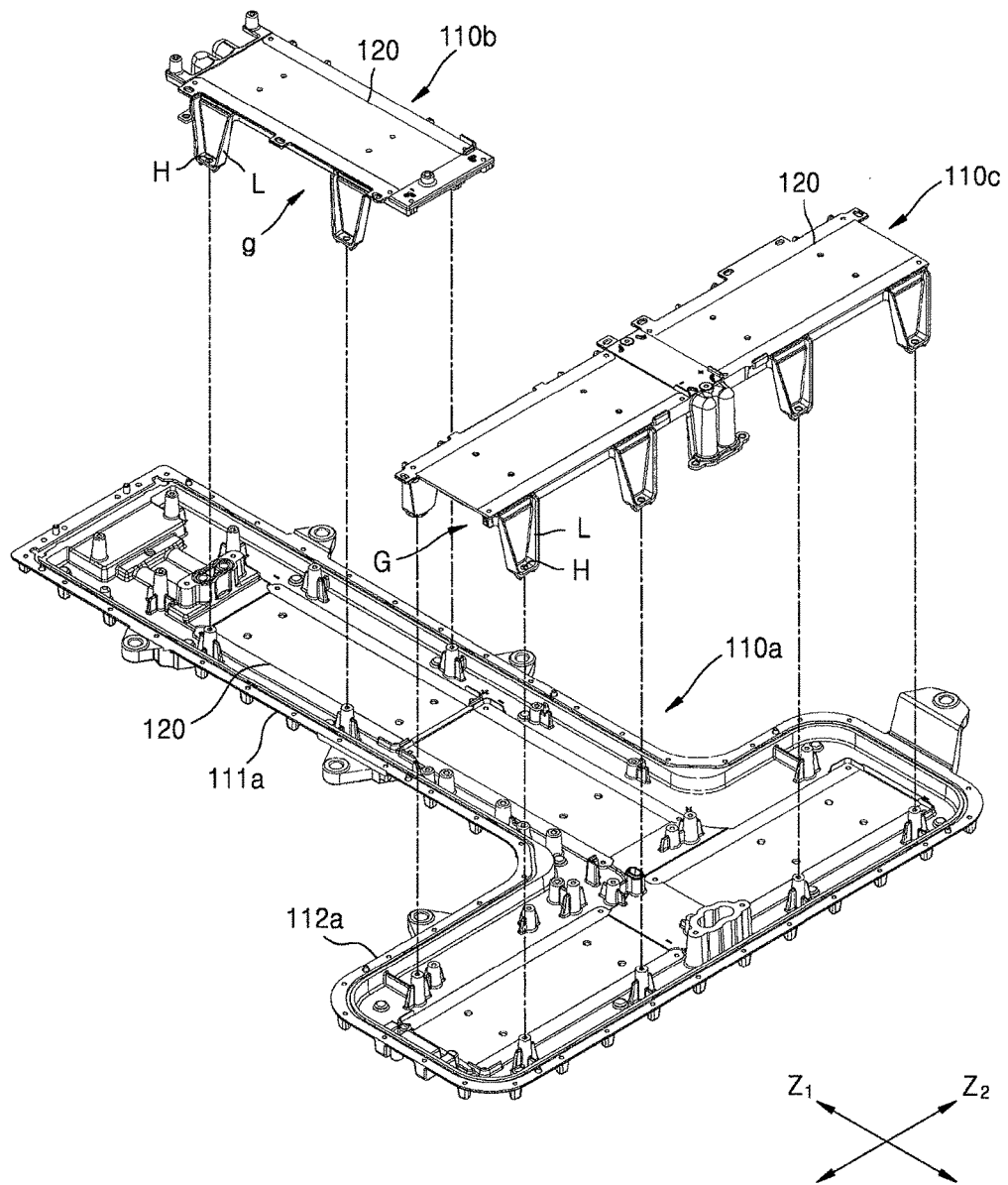
FIG. 2 illustrates an exploded perspective view of a first cooling plate and a battery pack in the battery module of FIG. 1.
Figure 3:
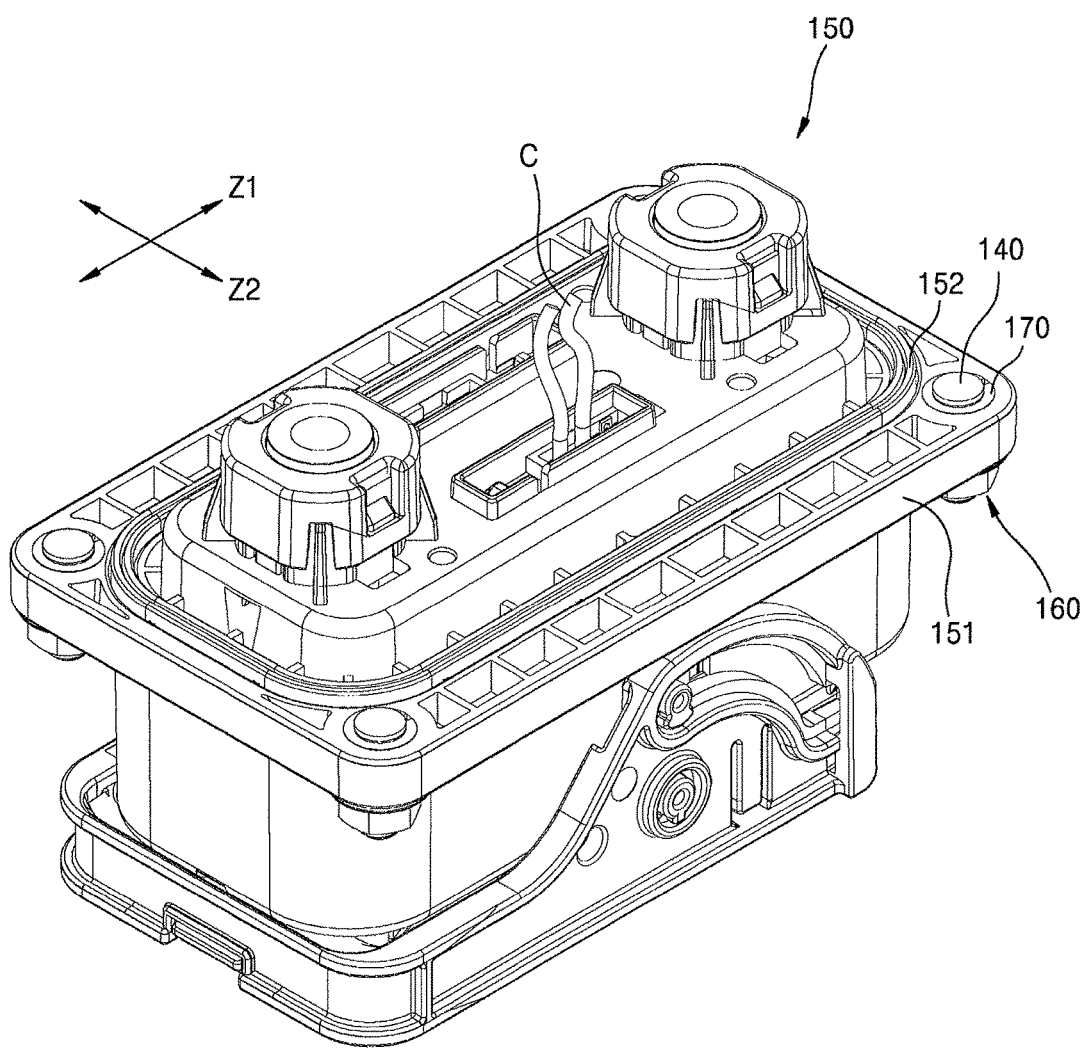
FIG. 3 illustrates a perspective view of a circuit module of FIG. 1.
Figure 4:
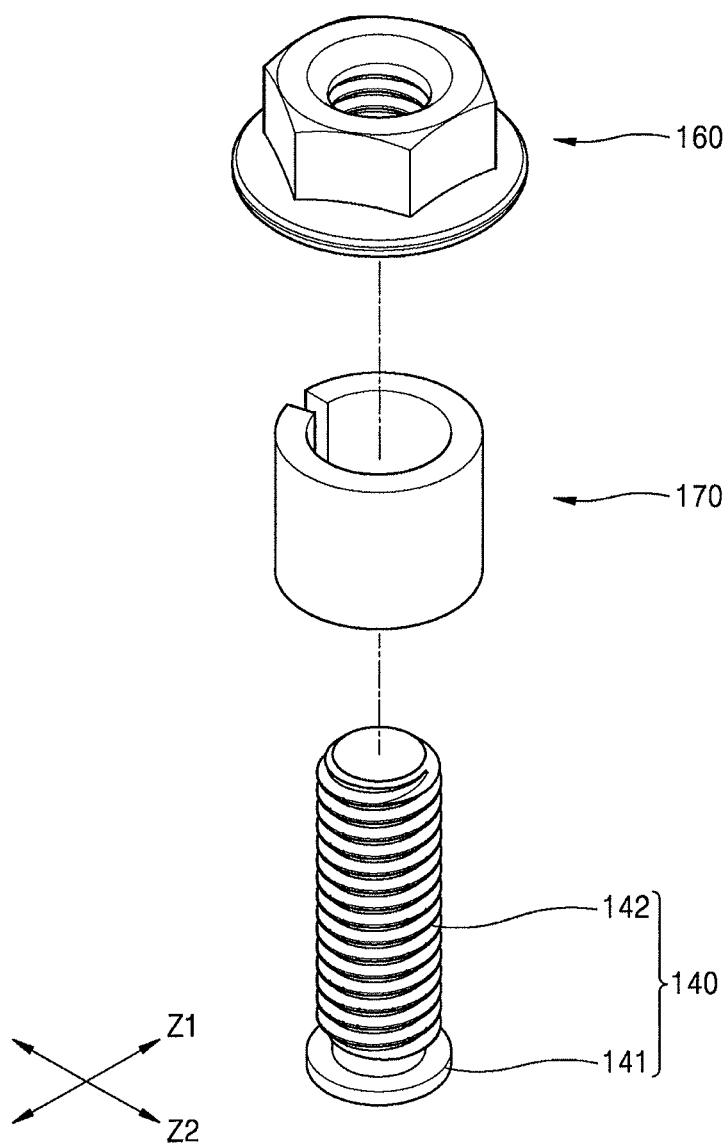
FIG. 4 illustrates a perspective view of a coupling portion, a bushing portion, and a fixing portion of FIG. 1.

FIG. 1 Illustrates an exploded perspective view of a battery module 100 according to an embodiment. FIG. 2 illustrates an exploded perspective view of a first cooling plate 110a and a battery pack 120 in the battery module 100 of FIG. 1. FIG. 3 illustrates a perspective view of a circuit module 150 of FIG. 1. FIG. 4 illustrates a perspective view of a coupling portion, a bushing portion 170, and a fixing portion 160 of FIG. 1.

Referring to FIGS. 1 to 4, the battery module 100 may include the first cooling plate 110a, the battery pack 120, a cover 130, a coupling portion 140, the circuit module 150, the fixing portion 160, and the bushing portion 170.

The first cooling plate 110a may support the battery pack 120. The first cooling plate 110a may be mounted on another structure.

Over the first cooling plate 110a, a second cooling plate 110b may be arranged to be spaced apart from the first cooling plate 110a and a pack accommodation portion G may be interposed therebetween. A third cooling plate 110c may be arranged to be spaced apart from the first cooling plate 110a and the pack accommodation portion G may be interposed therebetween.

The first to third cooling plates 110a, 110b, and 110c may directly contact the battery pack 120 to dissipate heat from the battery pack 120, and may dissipate the heat while also supporting the battery pack 120. The first to third cooling plates 110a, 110b, and 110c may respectively include first to third cooling passages to which a refrigerant is supplied to circulate therein, in order to dissipate heat from the battery pack 120. The first to third cooling passages may be embedded in the first to third cooling plates 110a, 110b, and 110c or may be integrally formed with the first to third cooling plates 110a, 110b, and 110c. The first to third cooling plates 110a, 110b, and 110c may respectively support the battery pack 120 at different heights from one another.

The first to third cooling passages may include dissimilar metal materials different from that of the first to third cooling plates 110a, 110b, and 110c, and may be manufactured by a die-casting method. For example, the first to third cooling plates 110a, 110b, and 110c may be formed by injecting melted metal for forming plates into a mold in which the first to third cooling passages are fixed. In this manner, the first to third cooling plates 110a, 110b, and 110c in which the first to third cooling passages are integrally embedded may be obtained. For example, the first to third cooling passages and the first to third cooling plates 110a, 110b, and 110c may include dissimilar metals different from each other, e.g., the first to third cooling passages may include a stainless steel (SUS) material having a relatively high melting point, and the first to third cooling plates 110a, 110b, and 110c may include an aluminum material having a relatively low melting point. For example, in a state where the first to third cooling passages including the SUS material are preliminary fixed in the mold, melted aluminum may be injected into the mold, and due to a difference between the melting points, the first to third passages may maintain tubular shapes thereof while sustaining solid phases. The first to third cooling passages and the first to third cooling plates 110a, 110b, and 110c having the first to third passages embedded therein may include the SUS material and aluminum having excellent thermal conductivity and having different melting points from each other, in order to sufficiently dissipate heat from the battery pack 120.

The battery pack 120 may include at least one battery cell, the number of which may vary. The battery cell may be a secondary battery.

The first cooling plate 110a may include a longitudinal direction portion 111a extending along a first direction Z1 and a transverse direction portion 112a extending along a second direction Z2. The first cooling plate 110a may have a T-shape as a whole. Two battery packs may be arranged over the longitudinal direction portion 111a along the first direction Z1, and two battery packs may be arranged over the transverse direction portion 112a along the second direction Z2.

The second cooling plate 110b may be elongated along the first direction Z1, and two battery packs may be arranged over the second cooling plate 110b along the first direction Z1. In addition, the third cooling plate 110c may be elongated along the second direction Z2, and two battery packs may be arranged on the third cooling plate 110c along the second direction Z2. A plurality of second cooling plates 110b and a plurality of third cooling plates 110c may be provided and arranged in a row.

The second cooling plate 110b may be spaced apart from the first cooling plate 110a and a pack accommodation portion G may be interposed therebetween, above the longitudinal direction portion 111a. The longitudinal direction portion 111a of the first cooling plate 110a and the second cooling plate 110b may be parallel with each other along the first direction Z1. The third cooling plate 110c may be spaced apart from the first cooling plate 110a and the pack accommodation portion G may be interposed therebetween, above the transverse direction portion 112a. The transverse direction portion 112a of the first cooling plate 110a and the third cooling plate 110c may be parallel with each other along the second direction Z2. The second cooling plate 110b and the third cooling plate 110c may be spaced apart from each other.

The first cooling plate 110a may configure a bottom of the entire battery module 100 and may provide a base of the entire battery module 100. For example, the second cooling plate 110b and the third cooling plate 110c may be supported on the first cooling plate 110a. The second cooling plate 110b and the third cooling plate 110c may include legs L for supporting the second and third cooling plates 110b and 110c from an upper portion of the first cooling plate 110a. For example, the legs L may be provided respectively between the first cooling plate 110a and the second cooling plate 110b and between the first cooling plate 110a and the third cooling plate 110c so as to support the second cooling plate 110b and the third cooling plate 110c such that the pack accommodation portion G is positioned between the first cooling plate 110a and the second or third cooling plate 110b or 110c. Coupling holes H may be formed in the legs L protruding from the second and third cooling plates 110b and 110c, and the second and third cooling plates 110b and 110c may be fixedly positioned via insertion members that penetrate through the coupling holes H to be coupled to the first cooling plate 110a.

The cover 130 may be located on the first cooling plate 110a on which the second cooling plate 110b and the third cooling plate 110c are fixed. The cover 130 may encapsulate the battery packs 120 positioned on the first to third cooling plates 110a, 110b, and 110c to protect the battery packs against external environment. For example, the first cooling plate 110a and the cover 130 may be assembled to face each other to form an accommodation space, in which the battery packs 120 are accommodated. The first cooling plate 110a and the cover 130 may have a same shape, e.g., a T-shape, so as to be assembled to face each other.

The circuit module 150 may be mounted on the cover 130. The cover 130 may include an insertion hole 131, into which a cable C connecting the circuit module 150 to the battery pack 120 and a part of the circuit module 150 may be inserted.

A surface of the cover 130 around the insertion hole 131 may be engraved such that the coupling portions 140 may be mounted. For example, the cover 130 may include mounting recesses 132 that are engraved in a direction toward the first cooling plate 110a such that the coupling portions 140 may be mounted thereon.

The mounting recesses 132 may be lower than an upper surface of the cover 130. A depth of the mounting recess 132 may be equal to or greater than a partial height of the coupling portion 140. The mounting recess 132 may have an edge that is inclined.

The coupling portions 140 may be fixed to the cover 130. For example, the coupling portions 140 may be fixed to the cover 130 via welding. The coupling portions 140 may be provided in various shapes. The coupling portion 140 may have a suitable shape such that the coupling portion 140 may be fixed to the cover 130 via the welding process to be inserted to the circuit module 150. For example, the coupling portion 140 may be formed with a pin shape. As another example, the coupling portion 140 may be formed as a stud bolt. Hereinafter, an example in which the coupling portion 140 is formed as a stud bolt will be described for convenience of description.

The coupling portion 140 may include a head portion 141 and an inserting portion 142. The head portion 141 may be inserted to the mounting recess 132 to be mounted therein. A height of the head portion 141 may be equal to or less than a depth of the mounting recess 132. The inserting portion 142 may extend from the head portion 141. A cross-sectional area in a direction perpendicular to a length direction of the inserting portion may be smaller than a cross-sectional area of the head portion 141 in a direction perpendicular to a height direction of the head portion 141. The inserting portion 142 may be inserted to the circuit module 150 and may penetrate therethrough. Here, a screw thread may be formed such that the fixing portion 160 may be coupled to an end of the inserting portion 142.

The coupling portion 140 may be mounted on the mounting recess 132 to be perpendicular to the cover 130. Bottom surfaces (or internal surfaces) of the head portion 141 and the mounting recess 132 may be connected to each other via welding. For example, the head portion 141 may be fixed to the bottom surface of the mounting recess 132 via a spot welding process.

The bottom surface of the mounting recess 132 may not contact the circuit module 150, but instead, may be spaced apart from the circuit module 150. In addition, the circuit module 150 and the cover 130 may contact each other at portions other than the mounting recess 132. As another example, a distance from the internal surface of the mounting recess 132 to an external surface of the circuit module 150 may be greater than a distance from the external surface of the circuit module 150 to an external surface of the cover 130.

Beads may be generated at an edge of the head portion 141 due to the welding process. The beads of the welding point generated at the edge of the head portion 141 may protrude outwardly. The head portion 141 may be positioned in the mounting recess 132 such that the head portion 141 may be welded on the bottom surface of the mounting recess. Thus, the bottom surface of the circuit module 150 may be adhered to the upper surface of the cover 130.

In this case, beads of welding points generated between the head portion 141 and the bottom surface of the mounting recess 132 may accumulate at an edge of the mounting recess 132, and thus, may not be formed on an external surface of the cover 130 over the mounting recess 132. For example, the edge of the mounting recess may be spaced apart from the edge of the head portion 141 so as to form a margin for storing the beads when the beads at the melting point are generated.

When the coupling portion 140 is fixed on the cover 130, the coupling portion 140 does not penetrate through the cover 130. For example, in a general case where a coupling portion is fixed to a cover, a hole is formed in the cover and the coupling portion is inserted into the cover to be fixed. In this case, external moisture may be introduced between the cover and a cooling plate through the hole formed in the cover, and thus may cause damage to a battery pack. However, according to embodiments, the coupling portion 140 is not inserted into the cover 130, but instead, is fixed on the cover 130 via welding. Thus, the coupling portion 140 may be fixed on the cover 130 without forming a hole.

The circuit module 150 may be positioned on the upper surface of the cover 130. The circuit module 150 may include a case 151 and a sealing portion 152 provided in the case 151. In addition, the circuit module 150 may include a control circuit that is positioned in the case 151 and connected to the battery pack 120 via the cable C.

The case 151 may be partially inserted into the insertion hole 131. The sealing portion 152 may be arranged on the case 151 so as to surround the edge of the insertion hole 131. The sealing portion 152 may prevent external moisture from infiltrating into the insertion hole 131 through a space between the case 151 and the cover 130. The coupling portions 140 may be located at an outer portion of the sealing portion 152. For example, the sealing portion 152 may be located between the coupling portions 140 and the insertion hole 131. The sealing portion 152 may be arranged closer to a center of the circuit module 150 than the coupling portions 140.

The control circuit may be accommodated in the case 151, and may be connected to the battery pack 120 via the cable C. The control circuit may control operations of the battery pack 120.

The fixing portions 160 may be coupled to the coupling portions 140 to fix the circuit module 150. The fixing portion 160 may include any type of device that is coupleable to the inserting portion 142 to fix the circuit module 150. The fixing portions 160 may be provided in suitable shapes. For example, the inserting portion 142 may be inserted into each of the fixing portions 160 to be coupled to the fixing portion 160. The fixing portion 160 may include a nut into which the inserting portion 142 is inserted. As another example, the fixing portion 160 may be a pin type member that is inserted into a hole formed in the inserting portion 142. As another example, the fixing portion 160 may include a bolt or a screw inserted into the inserting portion 142. One or more embodiments are not limited to the above examples, and. Hereinafter, a case where the fixing portion 160 includes a nut will be described for convenience of description.

The bushing portion 170 may be positioned between the inserting portion 142 and the case 151. For example, the bushing portion 170 may be inserted into the case 151, and the inserting portion 142 may be inserted into the bushing portion 170.

The bushing portion 170 may have a partially cut portion, and may be adhered respectively to the inserting portion 142 and the case 151. The bushing portion 170 may prevent movement of the inserting portion 142 or the case 151 and may fasten the case 151.

Figure 5:
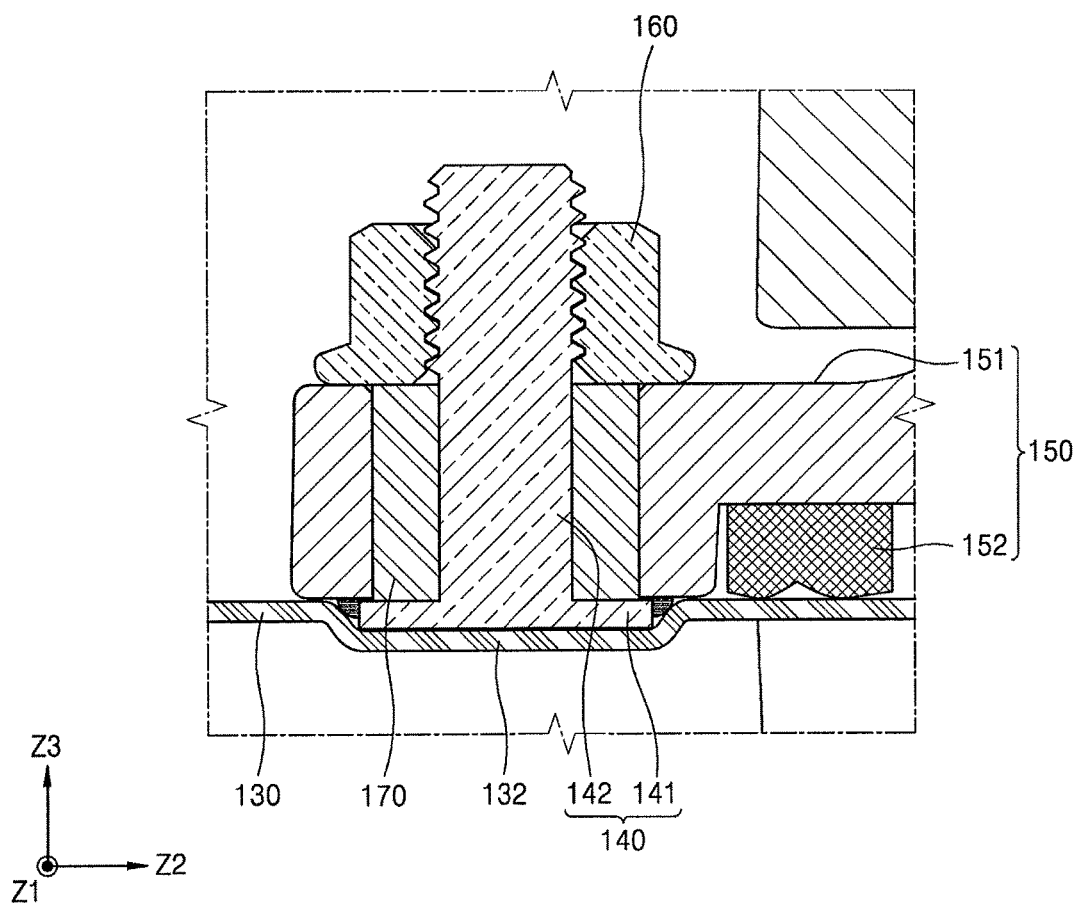
FIG. 5 illustrates a cross-sectional view of a cover, a coupling portion, a circuit module, a bushing portion, and a fixing portion of the battery module of FIG. 1.

FIG. 5 illustrates a cross-sectional view of the cover 130, the coupling portion 140, the circuit module 150, the bushing portion 170, and the fixing portion 160 in the battery module of FIG. 1.

Referring to FIG. 5, the mounting recess 132 may be formed in the cover 130 as described above. A plurality of mounting recesses 132 that are spaced apart from one another may be formed in the cover. For example, the mounting recesses 132 may be positioned at corners of the circuit module 150.

The head portion 141 of the coupling portion 140 may be inserted into the mounting recess 132. The head portion 141 may be coupled to the bottom surface (or internal surface) of the mounting recess 132 via spot welding. For example, beads at the welding point generated during the welding process may be situated in a space between the mounting recess and the head portion 141 so as not to be exposed to outside of the mounting recess 132. The coupling portion 140 may be bonded to the mounting recess 132 via welding after forming the mounting recess 132 in the cover 130. Accordingly, an additional hole does not need to be formed in the cover 130.

After arranging the coupling portion 140 as above, the inserting portion 142 may be inserted to the case 151 of the circuit module 150. The bushing portion 170 may be positioned between the inserting portion 142 and the case 151. The circuit module 150 may be positioned on an upper surface of the insertion hole 131, and may be partially inserted into the insertion hole 131.

The sealing portion 152 may be arranged between the coupling portion 140 and the insertion hole 131 as described above. A rear surface of the circuit module 150 may contact the upper surface of the cover 130, and the sealing portion 152 may be completely attached to the upper surface of the cover 130. The inserting portion 142 and the fixing portion 160 may be coupled to each other such that the circuit module 150 may be completely attached to the upper surface of the cover 130.

As described herein, it is not necessary to form an additional hole in the cover 130 in order to insert or fix the coupling portion thereto. Thus, infiltration of moisture into the cover 130 may be prevented. If a hole for coupling to the coupling portion 140 were to be formed in the cover 130, since the coupling portion 140 is arranged outside the sealing portion 152, external moisture could infiltrate into the cover 130 through the hole. However, as described above, the mounting recesses 132, and not a hole, are formed in the cover 130. The bottom surface of the mounting recesses 132 and the coupling portions 140 are fixed to each other via the welding process. Thus, forming a hole at the outer portion of the sealing portion 152 may be prevented and the sealing property of the sealing portion 152 may be improved.

Therefore, the battery module 100 may block external moisture at the portion where the circuit module 150 is installed, and thus, damage to the battery pack 120 due to the external moisture may be reduced.

According to the battery module 100 of the present embodiment, the mounting recesses 132 are formed so as to prevent lifting of the circuit module 150 from the cover 130 due to beads at the welding point while coupling the coupling portions 140 and to attach the sealing portion 152 to the cover 130.

According to the battery module 150 of the present embodiment, the circuit module 150 may be safely and firmly fixed to the cover 130. In addition, a leakage path may be elongated through the mounting recesses 132 in the battery module 100 of the present embodiment, and thus, sealing performance may be improved.

According to one or more embodiments, the sealing performance of the battery module may be improved, and the components of the battery module may be firmly coupled to one another.

According to one or more embodiments, the circuit module may be maintained at a fixed position while attaching to the cover. Thus, lifting of the circuit module may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
a first cooling plate;
a battery pack mounted on the first cooling plate;
a cover to shield the battery pack, the cover being coupled to the first cooling plate;
a coupling portion fixed to the cover, the coupling portion including a head portion fixed to a mounting recess in an external surface of the cover and an inserting portion protruding from the head portion in a direction away from the mounting recess, wherein the mounting recess does not include a hole through which the coupling portion passes, a depth of the mounting recess is equal to or greater than a height of the head portion, and the head portion is fixed to the mounting recess by a weld; and
a circuit module into which the inserting portion or the coupling portion is inserted, the circuit module being mounted on the cover to be electrically connected to the battery pack.

2. The battery module as claimed in claim 1, wherein the mounting recess of the cover has an inclined edge.

3. The battery module as claimed in claim 1, wherein the circuit module further includes a sealing portion, the sealing portion being located closer to a center of the circuit module than the coupling portion.

4. The battery module as claimed in claim 1, wherein a part of the circuit module contacts an external surface of the cover.

5. The battery module as claimed in claim 1, further comprising a bushing portion positioned between the coupling portion and the circuit module.

6. The battery module as claimed in claim 1, wherein a surface of the cover that is in contact with the head portion is spaced apart from the circuit module.

7. The battery module as claimed in claim 1, further comprising a fixing portion coupled to the coupling portion to fix a position of the circuit module.

* * * * *